United States Patent [19]

Nasu et al.

[11] Patent Number: 4,836,952
[45] Date of Patent: Jun. 6, 1989

[54] DEOXYGENATING COMPOSITION

[75] Inventors: Yasunobu Nasu, Fuchu; Haruhiko Uchida, Musashimurayama, both of Japan

[73] Assignee: Nippon Kayaku Kabushiki Kaisha, Tokyo, Japan

[21] Appl. No.: 36,782

[22] Filed: Apr. 9, 1987

[30] Foreign Application Priority Data

Apr. 16, 1986 [JP] Japan ................... 61-87763

[51] Int. Cl.$^4$ ............ C09K 15/02; C09K 15/30; C09K 15/32; A23B 4/14
[52] U.S. Cl. .............. 252/188.28; 252/400.53; 252/400.52; 252/400.54; 252/400.61; 252/400.62; 252/401; 252/405; 426/541; 426/544; 426/545
[58] Field of Search ............. 252/188.28, 400.53, 252/400.1, 400.61, 400.62

[56] References Cited

U.S. PATENT DOCUMENTS

| | | | |
|---|---|---|---|
| 3,458,548 | 7/1969 | Carlson | 252/400.1 X |
| 4,166,807 | 9/1979 | Komatsu et al. | 252/188.28 X |
| 4,230,595 | 10/1980 | Yamaji et al. | 252/188.28 |
| 4,366,179 | 12/1982 | Nawata et al. | 426/395 |
| 4,384,972 | 5/1983 | Nakamura et al. | 252/188.28 X |
| 4,657,740 | 4/1987 | Feldman | 252/188.28 X |

FOREIGN PATENT DOCUMENTS

| | | |
|---|---|---|
| 1109499 | 6/1961 | Fed. Rep. of Germany . |
| 50-51586 | 5/1975 | Japan ............ 252/400.53 |
| 53-658 | 1/1978 | Japan . |

*Primary Examiner*—John F. Terapane
*Assistant Examiner*—Virginia B. Caress
*Attorney, Agent, or Firm*—Henry C. Nields

[57] ABSTRACT

The present invention relates a deoxygenating composition comprising a metal-chelated resin and an iron powder.

The composition of the present invention is useful, for example, as an agent for preservation of foods.

12 Claims, No Drawings

4,836,952

DEOXYGENATING COMPOSITION

DETAILED DESCRIPTION OF THE INVENTION

1. [Field of the Invention]

The present invention relates to a novel deoxygenating agent, which has an effect of preventing the putrefaction and mildewing or oxidation and insect pests of foods, the insect pests and mildewing of clothing, rusting of metal goods, and oxidation of the other easily oxidizable materials, as well as the prior deoxygenating agents.

2. [Background of the Invention]

Main members of components of the prior deoxygenating agents comprised (a) metal powders and metal halides, (b) ferrous compounds and alkaline substances such as sodium acetate decahydrate, sodium sulfate decahydrate or alkali hydroxides, (c) organic reductive substances such as ascorbic acid and alkaline substances, and (d) hydrosulfite and alkaline substances.

Those deoxygenating agents included water-soluble substances in their composition, so these substances tend to leak out from air-permeable bags or containers to pollute foods, and their effectiveness of deoxygenation was not always so much satisfied. In addition, complicated control of the deoxygenating speed and of the dependence on environmental humidity caused some troubles.

The applicants of the present invention applied formerly to an invention resolving these problems for patent (U.S. patent application No. 921,689) now abandoned. The present invention intends to give a novel deoxygenating agent in which it is unnecessity necessary to use any water soluble substance and exhibits a strong deoxygenating effect in spite of its small size and weight, as well as the above invention, and also is more simplified in its controlling the deoxygenating speed and the dependence on environmental humidity.

The aforementioned invention relates to "a deoxygenating agent comprising a basic anion-exchange resin substituted by a halide ion and iron powders". The present inventors found that the object of this invention was achieved also by the other mechanism different to the above invention according to their further research, and so accomplished the present invention.

[SUMMARY OF THE INVENTION]

The necessary condition for the patent construction of the present invention means "a deoxygenating composition comprising a metal-chelated resin and an iron powder".

[DETAILED DESCRIPTION OF THE INVENTION]

At first, the substances to be used in the present invention will be described.

By the "metal-chelated resin" used in the present invention is meant a resin wherein a Chelate-type Resin is bound by chelating with a metal ion except $Pb^{2+}$, $Cd^{2+}$ and $Cr^{3+}$. By the "Chelate-type Resin" is meant a resin having a group (herein after referred to as "chelating group") capable of chelating which contains nitrogen.

The chelating group includes primary, secondary and tertiary amines. The examples of the materials of the resin include styrene, phenol, epoxyamine, acryl and pyridine polymers.

The Chelate-type Resin used in the present invention includes, for example, the following:

(1) A basic anion-exchange resin to which a chelating agent is bound. Examples of the basic anion-exchange resin are:

Amberlite IRA-45 or IRA-68 which will be abbreviated as ZRA-45 or IRA-68 hereinafter. Both are products of Rohm and Haas Company;

Dowex MSA-2 which will be abbreviated as MSA-2 hereinafter. A product of The Dow Chemical Company; and Muromac A-7 which will be abbreviated as A-7 hereinafter. A product of Muromachi Chemical Industry Co., Ltd.

Examples of the chelating agent include:

disodium ethylenediaminetetraacetate which will be abbreviated as EDTA-2Na hereinafter;

trans-cyclohexanediaminetetraacetic acid;

diaminopropanoltetraacetic acid;

triethylenetetraminehexaacetic acid; and ethylenediaminedi-o-hydroxyphenylacetic acid.

A Chelate-type Resin may be easily obtained by contacting one of these basic anion-exchange resins, especially weak basic anion-exchange resins, to an aqueous solution of these chelating agents. The amount to be used of the chelating agents depends on an ion-exchange capacity of the ion-exchange resins and a molecular weight of the chelating agents, and it is preferable to saturate the ion-exchange resin with the chelating agents. Generally, it is preferably to an extent of at least about 0.5 to 5 parts by weight of the chelating agents compared to 100 parts by weight (calculated as a dry material (Moisture content is about less than 3%)) of the ion-exchange resin. In addition, a concentration of the chelating agents in their aqueous solution is not particularly limited at any concentrations wherein the chelating agent may be in solution, for example, at a concentration of about N/100 to N/10 preferably. It is supposed that the formation of the Chelate-type Resin is an ionic bond of the primary, secondary and tertiary amines in a basic anion-exchange resin to a carboxyl group of the chelating agent.

(2) A commercially available chelate resin Chelate resins have been developed for adsorption of heavy-metal ions, and they are the ones highly capable of chelating a heavy-metal ion, preferably the ones wherein a tertiary amine, in particular, amidoxime, aminophosphoric acid, dithiocarbamic acid, pyridine or iminodiacetic acid groups are bound as a chelating group. In practice, examples of these resins are:

Duolite® CS-346, in which an amidoxime group is bound to an acryl resin;

Duolite® ES-467, in, which an aminophosphoric acid is bound to a styrene resin;

Both are products of Duolite International.

Sumichelate® Q-10R, in which a dichiocarbamic acid is bound to an acryl resin;

Sumichelate® CR-2, in which pyridine is bound to a pyridine resin;

Sumichelate® MC-30, in which a iminodiacetic acid is bound to a styrene resin.

These products of Sumitomo Chemical Co., Ltd.

(3) A basic anion-exchange resin capable of directly chelating with a metal ion such as $Cu^{2+}$, $Fe^{2+}$, $Fe^{3+}$, $Ni^{2+}$ or $Co^{2+}$.

Namely, a basic anion-exchange resin can, as a matter of course, bind to an anion. However those cited in (1) can stably bind to a cation such as $Cu^{2+}$ or $Fe^{3+}$. An acidic cation-exchange resin to which a metal ion is bound via an ionic bond cannot achieve the objects of the present invention.

A metal-chelated resin may be prepared by binding one of these Chelate-type Resin to a metal ion. Examples of the metal ion available in the present invention include $K^+$, $Na^+$, $Mg^{2+}$, $Ca^{2+}$, $Al^{3+}$, $Mn^{2+}$, $Fe^{2+}$, $Fe^{3+}$, $Co^{2+}$, $Ni^{2+}$, $Cu^+$, $Cu^{2+}$, $Zn^{2+}$, $Nb^{5+}$, $Ag^+$, $Sn^{2+}$, $Sb^{3+}$, $Au^{3+}$, $Hg^{2+}$, $Bi^{3+}$ and $Pt^{4+}$. Most of metal ions capable of chelating other than $Pb^{2+}$, $Cd^{2+}$ and $Cr^{3+}$ are available. When $Pb^{2+}$, $Cd^{2+}$ or $Cr^{3+}$ are used, the objects of the present invention cannot be achieved. Examples of the sources supplying these metal ions are water-soluble metal salts such as $KCl$, $Na_2SO_4$, $MgSO_4$, $CaCl_2$, $AlCl_3$, $MnCl_2$, $FeSO_4$, $Fe_2(SO_4)_3$, $COCl_2$, $NiCl_2$, $CuCl$, $CuSO_4$, $ZnCl_2$, $NbCl_5$, $AgNO_3$, $Ag_2SO_4$, $SnSO_4$, $SbCl_3$, $HAuCl_4$, $HgCl_2$, $BiCl_3$ and $H_2PtCl_6$.

A metal-chelated resin may be readily obtained by contacting an aqueous solution of one of these metal-ion sources with a Chelate-type Resin. The amount used of the sources supplying the metal ions depends on their kinds and ion-exchange capacity of the Chelate-type Resin, and is preferably to an extent of about 1 to 50 parts by weight compared to 100 parts by weight (calculated as a dry material) of Chelate-type Resin in general. The concentration of their aqueous solution is preferably to an extent of about 0.001 to 10%. When an excess of the metal ions is used, the excessive metal ion is preferably washed away with water.

The metal-chelated resin may be in a granular, ground or powdery form. Its water content is preferably employed to an extent of about 0 to 70%. In addition, a grain size of the resin is selected preferably below 20 mesh (Tyler), more preferably about 100 to 250 mesh.

Preferable examples of the iron powder to be used in the present invention are electrolytic and reduced iron powders. However it is not restricted thereby and any material mainly comprising an iron powder may be used as a matter of course. The grain size of an iron powder is employed preferably below 60 mesh (Tyler), more preferably about 150 to 250 mesh. Generally, deoxygenating speed would increase according to a decreasing size of grains of the metal-chelated resin and iron powder. Consequently, a selection of their grain size leads to the compositions of a variety of deoxygenating speed.

A deoxygenating composition of the present invention can be obtained by mixing one part by weight (calculated as a dry material) of the said metal-chelated resin with about 0.5 to 600 parts by weight, preferably about 4 to 200 parts by weight, or more preferably about 10 to 100 parts by weight of the iron powder.

The appropriate amount of the metal-chelated resin is roughly proportional to that of the iron powder (to be described in Experiment 5).

The composition according to the present invention is sealed up in an air-permeable bag to provide a deoxygenating agent for preservation of foods. The proportion of the composition of the present invention contained in the deoxygenating agent is about 1 to 100%, preferably about 5 to 100%. Either the said composition may be packed after mixing, or the resin and iron powder may be packed separately into an air-permeable bag.

When these two components are separately packed, it is desirable to mix them together as homogeneous as possible by turning upside down or shaking the air-permeable bag or container after packing, though a significant deoxygenating effect may be obtained even if these components are not homogeneously mixed together. The mixture of the metal-chelated resin with the iron powder may be formulated into tablets in a conventional manner. Further these components or a mixture thereof may be laminated on, for example, a sheet prior to the use.

Among these deoxygenating agents, an environmental humidity-depending agent containing a metal-chelated resin with less than about 20% of water content, develops a deoxygenating effect by absorbing the surrounding moisture. Therefore, those deoxygenating agents are served for preservation of foods with a high moisture such as raw noodles, cut rice-cakes, sponge-cakes, breads, meats and fishes.

A self-reaction expediting deoxygenating agent containing a metal-chelated resin with a water content of more than about 20%, preferably to an extent of about 40 to 70%, exhibits a deoxygenating effect independently of the presence of a surrounding moisture. Therefore, those deoxygenating agents are served not only for preservation of foods with high moisture, but also of dry foods such as beef jerky and coffee. The ones containing the metal-chelated resin with even less than about 20% of water content, may be available as a self-reaction expediting type of deoxygenating agent in combination of the composition with about 0.05 to 5 parts by weight, preferably about 0.1 to 3 parts by weight of a moisture source comprising known porous materials such as cellulose, kieselguhr, kaolin, silicic acid and its metal salts, for example silica gel and calcium metasilicate, or active carbon, each containing about 10 to 80% of water.

When a self-reaction expediting type of deoxygenating composition of a high reaction rate is to be prepared, it is desirable to mix the metal-chelated resin with the iron powder and pack the mixture into individual bags in an atmosphere of an inert gas such as nitrogen gas.

When a deoxygenating agent using a deoxygenating composition of the present invention is employed in preserving roast coffee, it is desirable to give for the said agent a capacity of absorbing $CO_2$ in order to prevent a bulging or breaking of packages by $CO_2$ evolved from roast coffee. It is attained by combining a deoxygenating agent of self-reaction expediting type using a deoxygenating component of the present invention with our alkaline substances capable of removing $CO_2$. Examples of the substance capable of removing $CO_2$ include hydroxides and oxides of alkaline metal and of alkaline-earth metals such as $NaOH$, $Ca(OH)_2$, $Mg(OH)_2$, $Ba(OH)_2$ and $CaO$. These substances may be used in mixtures of two or more such as soda lime according to purposes.

Further, these substances may be used in either form of grain or of powder, but it is preferable in view of efficiency of $CO_2$ absorption and convenience to treatment to use in about 60 to 250 mesh (Tyler), more preferable in about 100 to 200 mesh. The amount to be used of them is determined stoichiometrically corresponding to the volume of $CO_2$ evolved from coffee. Though the evolved amount of $CO_2$ varies widely according to the kind of coffee, degree of roasting and conditions of degassing throughout roasting, both purposes of deoxygenation and decarbonation may be attained by using about 0.1 to 30 parts by weight, preferably about 0.1 to 30 parts by weight of the said alkaline substances per 1 part by weight of a deoxygenating composition of the present invention.

A mixture of a component of a self-reaction expediting deoxygenating agent with an alkaline substance capable of removing $CO_2$ may be used as a deoxygenating agent suitable for coffee, but a deoxygenating composition of the present invention is preferably apart from the alkaline substance to exhibit a deoxygenating effect in a short time.

In addition, a deoxygenating agent of self-reaction expediting type may be hereby used without any special limitations, but the preferable one comprises a metal-chelated resin of less than 20% of water content and a moisture source, those which are preferably used separately from point of view of an easy treatment. Such a deoxygenating agent can be made by packing the above-mentioned composition comprising a metal-chelated resin of less than 20% of water content and iron powder and a composition comprising an alkaline substance capable of removing $CO_2$ and a moisture source, in the above-mentioned proportions, for example, in bag separately, not to mix each other.

As a preferable example of these deoxygenating agents, wherein a composition (1) comprising 1 part by weight of a chelated resin bound to an iron ion (dry material) and about 10 to 100 parts by weight of iron powder, and a composition (2) comprising about 1 to 15 parts by weight of an oxide or a hydroxide of an alkaline-earth metal and about 0.05 to 3 parts by weight of calcium metasilicate with water content of about 10 to 80% per 1 part by weight of the composition (1), co-exist with each other without contact directly, is mentioned. Both compositions may co-exist without contact directly, for example, by packing the former composition in a smaller bag, which is subsequently packed together with the latter one in a larger bag.

A deoxygenating composition of the present invention is able to absorb so rapidly oxygen, that its amount to be used may be much decreased as compared with the usual agent comprising iron and metal halides, and also it is always applicable to any packages wherein a relative humidity of air is about 0 to 100%. Further, its capacity of removing oxygen gas is arbitrarily variable depending on varying weights of a deoxygenating agent.

When a deoxygenating agent according to the present invention was properly selected and applied to package foods such as raw chinese noodle, fried dry noodle, cut rice-cake, sponge cake, dried small sardines, powder milk, peanut, seasoned cuttle chip and salami sausage, it removed no less rapidly than the model experiments (tests for the self-reaction expediting type and environmental humidity depending type) mentioned later.

Thus, a deoxygenating agent according to the present invention provides various significant effects, that it exhibits a strong deoxygenating effect in spite of its small size and weight, that it simplifies control of deoxygenating speed and dependence on environmental humidity, and further that it removes anxiety about pollution of foods owing to no need to use water-soluble materials.

Moreover, the present invention is effective on preservation of roast coffee by using in combination with a $CO_2$-absorbent.

Further, a deoxygenating agent produces heat with proceeding of deoxygenating reaction, as well as the formerly known deoxygenating agent, so may be served for a warming or heat-reserving agent.

Accomplishment of the present invention make it possible to supply a deoxygenating agent having excellent characteristics never available, so that it is assured that a said agent will be hereafter utilized widely for preservation of quality of foods.

To further illustrate the present invention, the following Examples of Experiments will be given. In these Examples, the capability of each deoxygenating composition was evaluated in the following manner.

Test of a self-reaction proceeding expediting type: A deoxygenating composition was packed in a vinylidene chloride-coated polypropylene bag, which will be abbreviated as a KOP bag hereinafter, and the bag was hermetically sealed under deaerating. Then air was injected thereinto via a self-adhesive rubber plate (mfd. by Toray Engineering Co., Ltd.) applied on the surface of the KOP bag to a total content of air in the bag of about 250 ml. This package was preserved at 25° C. and the oxygen gas concentration in the bag was determined with the lapse of time with an oxygen meter (Toray Zirconia Oxygen Meter LC700T; sample volume: 5 ml).

Test of an environmental humidity-depending type: The procedure of the above-described test was followed except that tissue paper containing 4 ml of water was packed in the KOP bag as a moisture source. Unless otherwise noted, the tests of a self-reaction expediting type and an environmental humidity-depending type were carried out hereinbelow under the above-described conditions.

EXPERIMENT D-1

EXAMPLES D-1 to D-4

Effect of the type of resin:

To 10-g portions of four basic anion exchange resins, wherein a chlorinated one was converted into a free one by treating the same with sodium hydroxide, 100 ml of a 1/100 N aqueous solution of EDTA-2Na was added. Each mixture was stirred to thereby complete the reaction and washed several times with water. Thus four kinds of Chelate-type Resins were obtained. 100 ml of a 1% aqueous solution of $Fe_2(SO_4)_3$ was added to each Chelate-type Resin and the mixture was stirred to thereby complete the reaction. After washing several times with water, the excessive moisture was wiped away with qauze to thereby give a granular metal-chelated resin (reddish brown, 20- to 50-mesh particles, water contents about 60%).

0.4 g of each metal-chelated resin was packed in an air-permeable bag, wherein one side was made of paper while the other side polyethylene, together with 0.4 g of a reduced iron powder. Thus four deoxygenating compositions of the present invention were obtained.

Table D-1 shows the results of these tests.

TABLE D-1

| Deoxygenating composition | Test of a self-reaction expediting type | | |
|---|---|---|---|
| | | $O_2$ concentration (%) | |
| (Example No.) | Resin | after 6 hr | after 24 hr |
| 1 | IRA-45 | 7.7 | 0.000 |
| 2 | IRA-68 | 5.04 | 0.000 |
| 3 | MSA-2 | 15.4 | 0.092 |
| 4 | A-2 | 11.8 | 0.016 |

Table D-1 indicates that a deoxygenating composition sufficiently available in a practical use can be obtained by using each resin.

EXPERIMENT D-2

EXAMPLES D-5 and D-6

The use of a commercially available chelate resin:

100 ml of a 1% aqueous solution of $Fe_2(SO_4)_3$ was added to 10 g portions of two chelate resins and the procedure of Experiment D-1 was followed. Thus two deoxygenating compositions of the present invention were obtained.

These deoxygenating compositions were subjected to the test of self-reaction expediting type. Table D-2 shows the results.

TABLE D-2

| Deoxygenating composition (Example No.) | Resin | $O_2$ concentration (%) after 6 hr | after 24 hr |
|---|---|---|---|
| 5 | CR-2 | 8.0 | 0.000 |
| 6 | Q-10R | 13.1 | 0.010 |

Test of a self-reaction expediting type

Table D-2 indicates that deoxygenating compositions sufficiently available in a practical use can be prepared by using commercially available chelate resins.

EXPERIMENT D-3

EXAMPLES D-7 and D-8

The use of a basic anion exchange resin to which no chelating agent is bound:

100 ml of a 1% aqueous solution of $Fe_2(SO_4)_3$ or a 1% aqueous solution of $CuSO_4$ was added to 10 g of a basic anion exchange resin IRA-45. Then each mixture was stirred to thereby complete the reaction. The two resins turned from yellow to reddish brown and blue, respectively, as the reaction proceeded. After washing several times with water, the procedure of Experiment D-1 was followed to thereby give two deoxygenating compositions of the present invention.

These deoxygenating compositions were subjected to the test of a self-reaction expediting type. Table D-3 shows the result.

TABLE D-3

Test of a self-reaction expediting type

| Deoxygenating composition (Example No.) | Metal ion | $O_2$ concentration (%) after 6 hr | after 24 hr |
|---|---|---|---|
| 7 | $Fe^{3+}$ | 15.4 | 1.54 |
| 8 | $Cu^{2+}$ | 12.2 | 0.124 |

Table D-3 suggests that the objects of the present invention can be achieved by binding $Fe^{3+}$ or $Cu^{2+}$ to a basic anion exchange resin to which no chelating agent is bound.

EXPERIMENT D-4

EXAMPLES D-9 to D-29

Effect of metal ion:

10 l of a 1/100 N aqueous solution of EDTA-2Na was added to 1 kg of a basic anion exchange resin IRA-45 and the mixture was stirred to thereby complete the reaction. After washing with water several times, a Chelate-type Resin was obtained. 100 ml of a 1% aqueous solution of a metal salt (100 ml of a standard 1000 ppm solution in the case of $Au^{3+}$ or $Pt^{4+}$) was added to 10 g of this Chelate-type Resin and the mixture was stirred to thereby complete the reaction. After washing with water several times, the reaction mixture was air-dried at approximately 60° C. Thus a metal-chelated resin of a moisture content of substantially 0% was obtained. Then the metal-chelated resin was ground to give a powder (150-mesh or below). 0.025 g of the obtained powder was packed in an air-permeable bag together with 0.8 g of a reduced iron powder. Thus 21 deoxygenating compositions of the present invention were obtained.

These deoxygenating compositions were subjected to the test of an environmental humidity-depending type. Table D-4 shows the result.

TABLE D-4

Test of an environmental humidity-depending type

| Deoxygenating composition (Example No.) | Metal ion | Source supplying metal ion | $O_2$ concentration (%) after 20 hr | after 48 hr |
|---|---|---|---|---|
| 9 | $K^+$ | KCl | 11.2 | 0.000 |
| 10 | $Na^+$ | $Na_2SO_4$ | 12.3 | 9.8 |
| 11 | $Mg^{2+}$ | $MgSO_4$ | 13.4 | 10.5 |
| 12 | $Ca^{2+}$ | $CaCl_2$ | 4.2 | 0.000 |
| 13 | $Al^{3+}$ | $AlCl_3$ | 5.5 | 0.000 |
| 14 | $Mn^{2+}$ | $MnCl_2$ | 6.0 | 0.000 |
| 15 | $Fe^{2+}$ | $FeSO_4$ | 0.000 | — |
| 16 | $Fe^{3+}$ | $Fe_2(SO_4)_3$ | 2.89 | 0.000 |
| 17 | $Co^{2+}$ | $CoCl_2$ | 11.0 | 0.000 |
| 18 | $Ni^{2+}$ | $NiCl_2$ | 9.4 | 0.006 |
| 19 | $Cu^+$ | CuCl | 12.4 | 0.052 |
| 20 | $Cu^{2+}$ | $CuSO_4$ | 0.009 | 0.000 |
| 21 | $Zn^{2+}$ | $ZnCl_2$ | 6.0 | 0.000 |
| 22 | $Nb^{5+}$ | $NbCl_5$ | 0.105 | 0.000 |
| 23 | $Ag^+$ | $AgNO_3$ | 0.80 | 0.000 |
| 24 | $Sn^{2+}$ | $SnSO_4$ | 3.82 | 0.011 |
| 25 | $Sb^{3+}$ | $SbCl_3$ | 0.81 | 0.000 |
| 26 | $Au^{3+}$ | $HAuCl_4$ | 0.000 | — |
| 27 | $Hg^{2+}$ | $HgCl_2$ | 2.24 | 0.000 |
| 28 | $Bi^{3+}$ | $BiCl_3$ | 9.0 | 0.125 |
| 29 | $Pt^{4+}$ | $H_2PtCl_6$ | 0.000 | 0.000 |

Table 4 suggests that various metal ions are available in the present invention. However $Pb^{2+}$, $Cd^{2+}$ and $Cr^{3+}$ showed no deoxygenating effect.

No deoxygenating effect was observed in a control case where the metal-chelated resin was replaced by a Chelate-type Resin prepared by binding EDTA-2Na to IRA-45. Further no deoxygenating effect was observed when metal ions including $Fe^{2+}$ were bound to an acidic cation exchange resin.

EXPERIMENT D-5

EXAMPLES D-30 to D-37

Effect of the ratio of metal-chelated resin to iron powder:

A metal-chelated resin powder was obtained by using a basic anion exchange resin IRA-45, EDTA-2Na and $Fe_2(SO_4)_3$ in the same manner as the one described in experiment D-4. 0.3 to 0.0025 g of this powder was mixed with 0.2 to 1.5 g of a reduced iron powder and each mixture was packed in an air-permeable bag. Thus eight deoxygenating compositions of the present invention were obtained. These deoxygenating compositions were subjected to the test of an environmental humidity-depending type. Table D-5 shows the result.

TABLE D-5

Test of an environmental humidity-depending type

| Deoxygenating composition (Example No.) | Metal-chelated resin (g; on dry material) | Iron powder (g) | $O_2$ gas concentration (%) after 30 hr |
| --- | --- | --- | --- |
| 30 | 0.3 | 0.2 | 0.002 |
| 31 | 0.2 | 0.3 | 0.000 |
| 32 | 0.10 | 0.4 | 0.000 |
| 33 | 0.05 | 0.6 | 0.001 |
| 34 | 0.025 | 0.8 | 0.000 |
| 35 | 0.010 | 1.0 | 0.005 |
| 36 | 0.005 | 1.2 | 0.154 |
| 37 | 0.0025 | 1.5 | 4.43 |

As shown in Table 5, deoxygenating compositions including the metal-chelated resin on a dry material and the iron powder at ratios of 0.3–0.010:0.2–1.0 show substantially similar deoxygenating effects to each other. The effect would gradually decrease in those including these components at ratios lower than 0.005:1.2. Those including them at ratios lower than 0.0025:1.5 are practically unavailable.

EXPERIMENT D-6

EXAMPLES D-38 and D-39

The deoxygenating composition of Example D-34 comprising 0.025 g of the metal-chelated resin and 0.8 g of the iron powder was mixed with 0.25 g of a wood-meal of a moisture content of 20% or 0.25 g of active carbon of a moisture content of 35%. Thus two deoxygenating compositions of the present invention were obtained. These deoxygenating compositions were subjected to the test of a self-reaction expediting type. As a result, the oxygen gas concentration after 24 hours was 0% in each case.

EXPERIMENT D-7

EXAMPLE D-40

500 ml of a 0.2% aqueous solution of $FeCl_3$ was added to 25 g of a chelate resin, Sumichelate® CR-2, and the mixture was stirred for 30 min. to finish the reaction, then followed by washing with a distilled water to give a completely decolorized supernatant. Thus, a Fe-chelated resin was obtained by removing water and air-drying overnight, and then ground to give a powder of which particle size is smaller than about 150 mesh. A mixture of 0.02 g of the Fe-chelated resin and 1 g of a reduced iron powder was packed in an air-permeable pouch, which was further packed together with a mixture of 2.3 g of a powder of $Ca(OH)_2$ and 0.7 g of a Calcium metasilicate $(CaSiO_3)$ powder with a water content of 60% in an air-permeable bag of a size larger than the pouch to give a deoxygenating agent for coffee according to the present invention.

The capability of the deoxygenating agent thus obtained for coffee was evaluated by the following manner. The above-deoxygenating agent and 105 g of roast coffee powder obtained by grinding after roasting 125 g of raw coffee beans were packed together in a KOP bag with an air to its content of about 450 ml in the bag. This package was left to a room temperature, and the oxygen and $CO_2$ gas concentrations in the head space of the bag were determined with the lapse of time to give 0.000% of an $O_2$ gas and also 0.0% of a $CO_2$ gas after 24 hours. The $CO_2$ gas concentration was determined with KITAGAWA Gas Detector (Kitagawa-Sangyo KK, for $CO_2$).

What is claimed is:

1. A deoxygenating composition comprising a metal-chelated resin which contains nitrogen and an iron powder, provided, however, that the metal of the metal-chelated resin is not $Pb^{+2}$, $Cd^{+2}$ or $Cr^{+3}$.

2. A composition according to claim 1 wherein the metal-chelated resin is a resin wherein a Chelate-type Resin is bound by chelating with a metal ion except $Pb^{2+}$, $Cd^{2+}$ and $Cr^{3+}$.

3. A composition according to claim 2 wherein the Chelate-type Resin is: a basic anion-exchange resin capable of directly chelating with a metal ion; a basic anion-exchange resin to which a chelating agent is bound; or a chelate resin.

4. A composition according to claim 3 wherein the chelating agent is disodium ethylenediaminetetraacetate, trans-cyclohexanediaminetetraacetic acid, diaminopropanoltetraacetic acid, triethylenetetraninehexaacetic acid or ethylenediamine di-o-hydroxyphenylacetic acid.

5. A composition according to claim 3, wherein the chelate resin is a resin having amidoxime, aminophosphoric acid, dithiocarbamic acid, pyridine or iminodiacetic acid group as a chelating group.

6. A composition according to claim 2 wherein the metal ion is $K^+$, $Na^+$, $Mg^{2+}$, $Ca^{2+}$, $At^{3+}$, $Mn^{2+}$, $Fe^{2+}$, $Fe^{3+}$, $CO^{2+}$, $Ni^{2+}$, $Cu^+$, $Cu^{2+}$, $Zn^{2+}$, $Nb^{5+}$, $Ag^+$, $Sn^{2+}$, $Sb^{3+}$, $Au^{3+}$, $Hg^{2+}$, $Bi^{3+}$ or $Pt^{4+}$.

7. A composition according to claim 1 comprising about 10 to 100 parts by weight of an iron powder to one part by weight of a metal-chelated resin (calculated as a dry material).

8. A deoxygenating agent which comprises either one of (1) a metal-cheltated resin which contains nitrogen, (provided, however, that the metal bound to the resin is not $Pb^{+2}$, $Cd^{+2}$ or $Cr^{+3}$) with less than 20% of a water content and a moisture source, or (2) a metal-chelated resin which contains nitrogen (provided, however, that the metal of the metal-chelated resin is not $Pb^{+2}$, $Cd^{+2}$ or $Cr^{+3}$) with more than 20% of a water content, an iron powder, and an alkaline substance capable of absorbing $CO_2$.

9. A deoxygenating agent according to claim 8 which comprises (a) a resin/iron composition consisting of (i) one part by weight (calculated as a dry material) of a metal-chelated resin with less than 20% of a water content and (ii) about 0.5 to 600 parts by weight of an iron powder (b) about 0.05 to 5 parts by weight of a moisture source with about 10 to 80% of a water content per 1 part by weight of said resin/iron composition; and (c) about 0.1 to 30 parts by weight of an alkaline substance capable of absorbing $CO_2$ per 1 part by weight of said resin/iron composition.

10. A deoxygenating agent according to claim 8, wherein a moisture source is cellulose, kieselguhr, kaolin, silicic acid and its salts, or an active carbon, and also an alkaline substance capable of absorbing $CO_2$ is a hydroxide or an oxide of an alkaline-earth metal.

11. A deoxygenating agent according to claim 8, wherein a moisture source is calcium metasilicate.

12. A deoxygenating agent wherein:
(a) a resin/iron composition consisting of 1 part by weight (calculated as a dry material) of a chelate resin which contains nitrogen, bound to an iron ion with less than 20% of a water content and about 10 to 100 parts by weight of an iron powder and (b) an alkaline-earth metal/calcium composition which comprises about 1 to 15 parts or a hydroxide of an alkaline-earth metal by weight per 1 part by weight of said resin/iron composition (a) and about 0.05 to 3 parts by weight of calcium metasilicate with about 0 to 80% of a water content per 1 part by weight of said resin/iron composition (a) co-exist with each other without contacting directly.

* * * * *